United States Patent [19]

Pardington

[11] 3,964,337
[45] June 22, 1976

[54] MOTION TRANSMITTING REMOTE CONTROL ASSEMBLY

[75] Inventor: Lawrence D. Pardington, Rochester, Mich.

[73] Assignee: Teleflex Incorporated, North Wales, Pa.

[22] Filed: Nov. 25, 1974

[21] Appl. No.: 526,575

[52] U.S. Cl. .............................. 74/501 P; 74/502; 74/531; 188/67
[51] Int. Cl.² .......................................... F16C 1/10
[58] Field of Search ............... 74/501 P, 502, 531; 188/67

[56] References Cited
UNITED STATES PATENTS

| | | | |
|---|---|---|---|
| 2,932,214 | 4/1960 | Crouse | 74/502 |
| 3,144,919 | 8/1964 | Foote et al. | 188/67 |
| 3,211,019 | 10/1965 | Roach et al. | 74/501 P |
| 3,348,427 | 10/1967 | Wilkey | 74/502 |
| 3,348,428 | 10/1967 | Shaeffer | 74/502 |
| 3,411,374 | 11/1968 | Holly | 74/502 |

*Primary Examiner*—William F. O'Dea
*Assistant Examiner*—Ronald C. Capossela
*Attorney, Agent, or Firm*—McGlynn and Milton

[57] ABSTRACT

A motion transmitting remote control assembly including a hanger body having a slideway extending therethrough in which a rod is slidably disposed with the rod attached to a flexible wire element which is, in turn, movably supported in a flexible conduit attached to the hanger body. The improvement resides in providing membranes formed integrally with the hanger body on opposite sides of the slideway with projecting portions extending into the slideway to bear against the rod so that the rod is held against movement between the membranes until a predetermined force is applied to the rod. The membranes are formed by bores extending into the hanger body parallel to the slideway so that the flexible membranes are formed between the slideway and each bore.

8 Claims, 3 Drawing Figures

MOTION TRANSMITTING REMOTE CONTROL ASSEMBLY

The subject invention relates to a motion transmitting remote control assembly of the type for transmitting motion in a curved path by a flexible motion transmitting element.

The subject invention relates to an improvement upon the invention set forth in U.S. Pat. No. 3,348,428 to Robert J. Shaeffer and assigned to the assignee of the subject invention. The aforementioned patent discloses a remote control assembly having a flexible conduit secured to a hanger body which is, in turn, adapted to be attached to a support structure with a rod slidably supported in the hanger body with a flexible wire element connected to the rod and slidably supported in the conduit. The free end of the wire element is adapted to be connected to an element to be controlled while the other end of the rod has a knob attached thereto for manually moving the rod and wire element.

Such remote control assemblies are variously utilized in marine, automotive and aircraft vehicles. For example, such remote control assemblies are typically utilized in automobiles to operate or control air vent controls. Often, the element being controlled, such as a vent in an automobile, is designed to maintain the position to which it is moved by friction. Frequently, however, the elements to be controlled, due to wear or the like, do not retain sufficient inherent frictional forces to maintain the position to which it has been moved by a control assembly. In other words, a vent control in an automobile may be moved to a given position by the control assembly yet air flowing past the vent control may be sufficient to move the vent control due to the fact that the vent control does not have sufficient inherent frictional resistance against movement to sustain itself in the position to which it has been moved by the control assembly.

A solution to this problem is shown in the abovementioned patent wherein the assembly is fabricated such that there is a proper amount of frictional resistance to the movement of the rod within the hanger body. This is accomplished by providing a thin resilient membrane forming a portion of the wall of the slideway extending through the hanger body to movably support the rod. The resilient membrane extends into the bore to provide a predetermined amount of resistance to the movement of the rod by bearing against the rod so that the rod is held against movement until a predetermined force is applied thereto. The resilient membrane is exposed to the exterior of the hanger body and is frequently difficult to form because of its thin configuration.

In accordance with the subject invention, an improved remote control assembly is provided wherein adjacent the slideway for supporting the motion transmitting core element there is at least one bore extending in a direction generally parallel to the slideway to define a flexible membrane between the slideway and the bore.

Other advantages of the present invention will be readily appreciated as the same becomes better understood by reference to the following detailed description when considered in connection with the accompanying drawings wherein.

Figure 1:
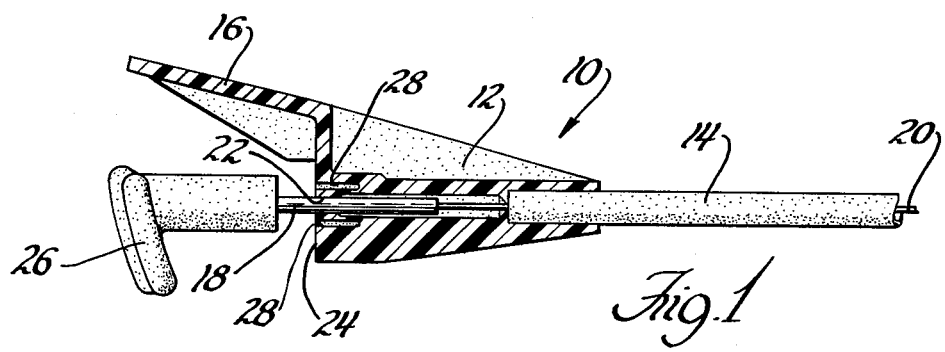
FIG. 1 is a fragmentary cross-sectional view of a preferred embodiment of the subject invention.
Figure 2:
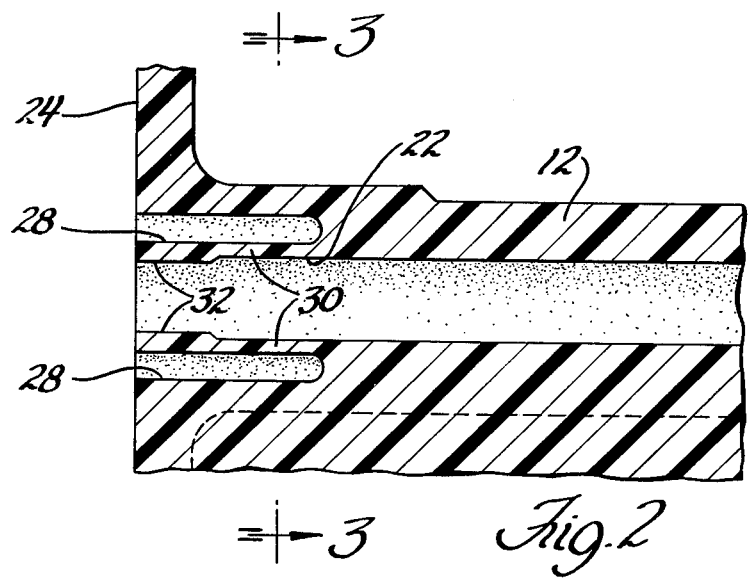
FIG. 2 is an enlarged fragmentary cross-sectional view similar to FIG. 1 but showing the slideway and adjacent bores defining the membranes.

A motion transmitting remote control assembly constructed in accordance with the instant invention is generally shown at 10 in FIG. 1.

The remote control assembly 10 includes a guide means comprising a hanger body 12 and a flexible conduit 14. The hanger body 12 is made of an organic polymeric material such as an acetyl resin and is adapted for attachment to a support structure by holes (not shown) through the flange 16.

The flexible conduit 14 is preferably of the type including an inner tubular liner with wires or filaments wound helically about the inner liner on a long lead with a casing extruded and disposed about the filaments and the inner liner. The conduit 14 is attached to the hanger body 12 as the two plastics thereof may be defused together during fabrication.

The assembly 10 includes a core element defined by the rigid rod 18 and the wire element 20. The wire element 20 is flexible and is movably supported within the conduit 14.

The hanger body 12 includes a slideway 22 extending therethrough from a front face 24 for movably supporting the rod 18 of the core element.

A knob 26 is secured to the distal end of the rod 18 for manually moving the rod relative to the hanger body 12. In some instances the conduit 14 may be eliminated as well as the wire element 20 whereby the rod 18 extends rearwardly from the hanger body 12 to be connected to an element to be controlled.

A pair of bores 28 extend into the hanger body from the front face 24 thereof adjacent to, spaced from and on opposite sides of the slideway 22 and in a direction generally parallel to the axis of the slideway 22 and coextensive with only a portion of the length of the slideway 22 to define the flexible membranes 30 between the slideway 22 and the bores 28.

Each membrane 30 includes a projecting portion 32 extending into the slideway 22 in the unflexed condition for engaging the rod 18 so as to be moved by the rod 18 into the adjacent bores 28 upon insertion of the rod into the slideway 22 for applying a predetermined frictional resistance to the movement of the rod 18. Thus, a predetermined force must be applied to the rod 18 to move the rod 18 relative to the hanger body 12.

Figure 3:
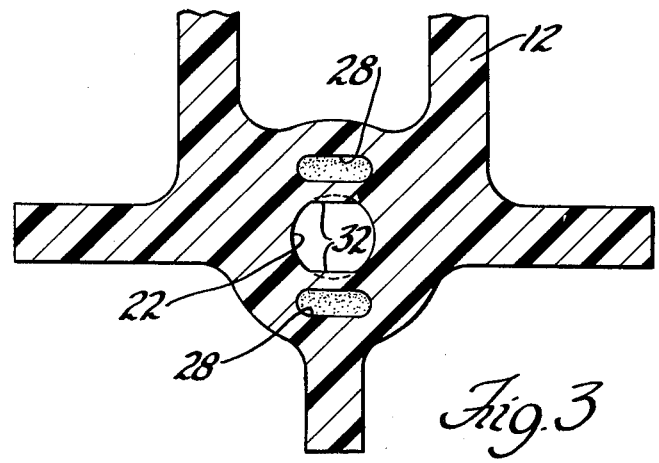
FIG. 3 is an enlarged fragmentary cross-sectional view taken substantially along line 3—3 of FIG. 2.

The slideway 22 is circular in cross section adjacent to and coextensive with the membranes 30 except in the area of the projecting portions 32 which traverse the slideway in the unflexed condition, as best shown in FIG. 3. The bores 28 are generally oval or elongated in cross section in a circumferential direction relative to the slideway 22.

As the rod 18 is inserted into the slideway 22, it engages the projecting portions 32 to move the membranes into the bores 28 whereby the rod 18 is frictionally gripped between the projecting portions 32 so that a predetermined force is required to move the rod 18. Thus, when the rod 18 is moved to a selected position it is held there by the projecting portions 32 of the membranes 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiment of the invention in which an exclusive property or privilege is claimed as defined as follows:

1. A motion transmitting remote control assembly comprising; guide means having a slideway extending therethrough, said guide means including a hanger body made of organic polymeric material and adapted for attachment to a support structure, said slideway extending completely through said hanger body, a core element movably supported by said guide means for transmitting motion and including a rod slidably disposed in said slideway, at least one bore extending into said hanger body adjacent to and spaced from said slideway and in a direction generally parallel to said slideway and coextensive with only a portion of the length of said slideway to define a flexible membrane between said slideway and said bore for engaging said rod.

2. An assembly as set forth in claim 1 wherein said membrane includes a projecting portion extending into said slideway in the unflexed condition for engaging said rod so as to be moved thereby into said bore for applying a predetermined frictional resistance to the movement of said rod whereby a predetermined force must be applied to said core element to move said core element relative to said guide means.

3. An assembly as set forth in claim 2 including a second bore extending into said hanger body to define a second flexible membrane between said slideway and said second bore.

4. An assembly as set forth in claim 3 wherein said bores are disposed on opposite sides of said slideway.

5. An assembly as set forth in claim 4 wherein said second membrane includes a second projecting portion extending into said slideway in the unflexed condition for engaging said rod so as to be moved by said rod into said second bore whereby said rod is frictionally gripped between said projecting portions of said membranes.

6. An assembly as set forth in claim 5 wherein said slideway includes a circular portion at least partially coextensive with said membranes, said projecting portions traversing said circular slideway in the unflexed condition.

7. An assembly as set forth in claim 6 wherein said bores are generally oval in cross section.

8. An assembly as set forth in claim 7 wherein said guide means further includes a conduit connected to said hanger body and said core element further includes a flexible motion transmitting core element connected to said rod and movably supported in said conduit.

* * * * *